US005756625A

United States Patent [19]
Crandall et al.

[11] Patent Number: 5,756,625
[45] Date of Patent: May 26, 1998

[54] STABILIZED ADHESIVE MICROSPHERES

[75] Inventors: Michael D. Crandall, North Oaks; Michael R. Kesti, Minneapolis, both of Minn.

[73] Assignee: Minnesota Mining and Manufacturing Company, St. Paul, Minn.

[21] Appl. No.: 731,351

[22] Filed: Oct. 11, 1996

[51] Int. Cl.⁶ .................... C08F 18/02; C08F 218/02; C08F 20/10; C08F 12/30
[52] U.S. Cl. .................... 526/320; 523/218; 523/223; 526/278; 526/287; 526/307; 526/307.7; 526/312
[58] Field of Search .................... 526/278, 287, 526/307, 307.7, 312, 320; 523/223, 218

[56] References Cited

U.S. PATENT DOCUMENTS

| | | | |
|---|---|---|---|
| 3,620,988 | 11/1971 | Cohen | 524/723 |
| 3,691,140 | 9/1972 | Silver | 526/240 |
| 3,857,731 | 12/1974 | Merrill, Jr. et al. | 428/314.4 |
| 4,166,152 | 8/1979 | Baker et al. | 428/522 |
| 4,276,212 | 6/1981 | Khanna et al. | 524/512 |
| 4,495,318 | 1/1985 | Howard | 524/375 |
| 4,598,112 | 7/1986 | Howard | 524/78 |
| 4,645,783 | 2/1987 | Kinoshita | 523/221 |
| 4,656,218 | 4/1987 | Kinoshita | 524/460 |
| 4,735,837 | 4/1988 | Miyasaka et al. | 428/40 |
| 4,786,696 | 11/1988 | Bohnel | 526/88 |
| 4,952,650 | 8/1990 | Young et al. | 526/194 |
| 4,988,567 | 1/1991 | Delgado | 428/402 |
| 5,053,436 | 10/1991 | Delgado | 521/64 |
| 5,215,818 | 6/1993 | Silver et al. | 428/343 |
| 5,571,617 | 11/1996 | Cooprider et al. | 428/341 |

FOREIGN PATENT DOCUMENTS

| | | | |
|---|---|---|---|
| 0 209 337 A2 | 1/1987 | European Pat. Off. | C09J 3/00 |
| 0 554 832 A | 8/1993 | European Pat. Off. | |
| 35 44 882 A1 | 11/1986 | Germany | C08L 33/06 |
| 93 12147 A | 6/1993 | WIPO | |
| 96 01295 A | 1/1996 | WIPO | |

Primary Examiner—Peter A. Szekely
Attorney, Agent, or Firm—Carolyn V. Peters

[57] ABSTRACT

Stabilized microsphere adhesive composition comprising: a plurality of polymeric, elastomeric microspheres wherein the microspheres are the reaction product of reactants comprising polymerizable starting materials comprising at least one $C_4$–$C_{14}$ alkyl (meth)acrylate monomer and optionally at least one comonomer, at least one vinyl-unsaturated additive having both an ionic moiety and a hydrophobic moiety and containing at least 5 but not more than 40 carbon atoms in an amount about 0.1 to 3 parts by weight of the microspheres; optionally, a polymeric stabilizer in an amount of between about 0.1 and about 3 parts by weight per 100 parts by weight of the microspheres; a surfactant in an amount of no greater than about 5 parts by weight per 100 parts by weight of the microspheres; optionally a modifier, wherein the modifier is at least one of a chain transfer agent, a tackifier, a solvent or the like in an amount that is sufficient to provide microspheres with a n-heptane soluble portion in the range of 30–98%; and (f) an initiator in an amount effective to catalyze the polymerization reaction present in amounts ranging from about 0.1 to approximately 2 parts by weight per 100 parts by weight of the polymerizable monomer starting material.

20 Claims, No Drawings

STABILIZED ADHESIVE MICROSPHERES

TECHNICAL FIELD

This invention relates to a composition of suspension polymerized adhesive microspheres and in particular to adhesive microspheres that exhibits enhanced adhesion to substrates while remaining repositionable and are more stable during polymerization and processing.

BACKGROUND OF THE INVENTION

Inherently tacky, elastomeric microspheres are known in the art to be useful in repositionable pressure-sensitive adhesive applications. As used herein, the term "repositionable" refers to the ability to be repeatedly adhered to and removed from a substrate without substantial loss of adhesion capability. Repositionable adhesives are used in the construction of temporary messaging or signage for the home and office environment. An example of such products are Post-it® self-stick notes sold by 3M Company.

Numerous references concern the preparation and/or use of inherently tacky, elastomeric acrylate polymeric microspheres which are solid in nature. Such spheres and their use in aerosol adhesive systems having repositionable properties are disclosed in U.S. Pat. No. 5,215,818. These microspheres are prepared by aqueous suspension polymerization of alkyl acrylate monomers and ionic comonomers, for example, sodium methacrylate, in the presence of emulsifier-preferably an anionic emulsifier. The ionic comonomers other then a mentioned are specifically zwitterionic in nature and are not shown to enhance suspension stability or performance.

U.S. Pat. No. 4,166,152 describes solid, inherently tacky (meth)acrylate microspheres which are prepared from nonionic alkyl acrylate or methacrylate monomer(s) in the presence of both an emulsifier and an ionic suspension stabilizer having an interfacial tension sufficient to prevent microsphere agglomeration. Such microspheres are also disclosed in U.S. Pat. Nos. 4,495,318 and 4,598,112, where the preparative methods involve the use of a non-ionic emulsifier or a cationic emulsifier. All three patents disclose utility as a "reusable adhesive".

Increasing the adhesion of these types of adhesives has been tried by various investigators: U. S. Pat. No. 5,053,436 provides a hollow core in the microsphere. In this morphology the microsphere is said to offer increased resistance to adhesive transfer and an increased adhesion level due to the hollow nature of the microsphere. U. S. Pat. No. 4,988,567 describes micropsheres having multiple small voids. These voids are said to enhance the adhesive properties of the microsphere. The microspheres described are said to be solvent insoluble.

U.S. Pat. No. 4,786,696 describes a suspension polymerization process for preparing solid, inherently tacky (meth) acrylate microspheres which does not require the use of either an ionic comonomer or an ionic suspension stabilizer in order to prevent agglomeration. Rather, the process requires agitation of the vessel charge prior to the initiation of the reaction sufficient to create a suspension of monomer droplets having an average monomer droplet size of between about 5 and about 70 micrometers. In addition to (meth) acrylate monomer, a minor portion of a non-ionic, vinylic comonomer such as e.g., acrylic acid may be included to modify the "tacky nature" of the microspheres. The resultant adhesive microspheres exhibit high tack values thought to be due to the lack of stabilizer on the microsphere surface.

U.S. Pat. No. 3,620,988 discloses a method of preparing "bead-type polymers" which involves the use of a water-insoluble polymeric thickening dispersing agent. The method can be applied to produce pressure-sensitive adhesives in the form of coatable bead suspensions, the adhesives comprising a high solids suspension/dispersion of a lightly crosslinked polymer of a higher alkyl acrylate and a tackifier.

U.S. Pat. No. 4,735,837 discloses a detachable adhesive sheet having an adhesive layer containing "elastic microballs", wherein the microballs partially protrude from the surface of the adhesive layer. The microballs may or may not be tacky. They can be derived from, e.g., (meth)acrylate monomer and an α-olefinic carboxylic acid monomer via suspension polymerization in an aqueous medium. However, no details as to the nature of the surfactants utilized, etc., are disclosed. The microballs and an adhesive are dispersed in solvent, mixed, and coated, with the ratio of adhesive to microballs being from about 1:10 to about 10:1. This ratio is disclosed to be critical in order that all microballs in the final product, including those protruding from the surface, are completely covered with the adhesive. A range of 1,000 to 150,000 pieces per square centimeter is disclosed as preferred.

DE 3,544,882 A1 describes crosslinked microspheres composed of 90 to 99.5 weight percent of (meth)acrylate ester and 10 to 0.5 weight percent of vinyl type monomer, e.g., acrylic acid, having a reactive functional group through which crosslinking is achieved by reaction with an oil-soluble crosslinking agent. The microspheres are prepared by dispersing in water a solution (in organic solvent) of copolymer prepared by known methods such as solution, bulk, emulsion, or suspension polymerization. (However, the reference notes that in cases where emulsion or suspension polymerization is used with water as a dispersion medium, it is not necessary to make a new aqueous dispersion.) When tacky, the spheres are said to be useful in spray or coated sheet form as "removable adhesive". The stated purpose of the invention is to provide microspheres having a uniform particle size, but it is also stated that the microspheres may contain other monomers such as vinyl acetate, styrene, acrylonitrile, methacrylonitrile, etc., ". . . to prevent partial transfer of the adhesive when the carrier is pulled away from the substrate . . . ".

U.S. Pat. Nos. 4,645,783 and 4,656,218 disclose a "repeatably usable and releasable sheet" coated with an aqueous suspension of microspheres obtained by aqueous suspension polymerization (in the presence of a protective colloid comprising casein as a main ingredient) of one or more alkyl (meth)acrylate esters, α-monoolefin carboxylic acids, and one or more other vinyl monomers.

The microspheres are preferably interspersed with finer polymer particles prepared by polymerization of one or more vinyl monomers in an aqueous medium. These fine polymeric particles are said to be ". . . effective in improving the anchorage to the adherend and the adhesion to the substrate after the aqueous suspension prepared in accordance with the present innovation is applied to the substrate".

U.S. Pat. No. 3,857,731 and EP 209,337 both address problems with adhesive microspheres transfer. The former discloses sheets coated with the tacky elastomeric copolymer microspheres of the Silver patent (U.S. Pat. No. 3,691,140) and a binder material which provides sockets in which the microspheres are held by predominantly mechanical forces. The latter states that adhesive microspheres could be put to more demanding applications if it were not for the drawback of adhesive transfer. Tacky, elastomeric microspheres are then described which have a composition formed from non-ionic monomers alone or together with a proportion of ionic comonomers wherein the ionic monomers are first dissolved in an organic cosolvent. The microspheres further comprise an adhesion-promoting monomer having a functionality which remains unreacted during polymerization of the monomers and is available for subsequently binding the microspheres through electrostatic interaction or chemical bonding to a substrate or binder-coated substrate. Preferably, the microspheres are derived from at least one alkyl acrylate or methacrylate ester.

U.S. Pat No. 5,326,842 describes the use of a dual polymerization process comprising first a suspension polymerization process, followed by an emulsion polymerization. This dual polymerization allows for low or high tack coatings to be prepared. For high tack coatings a chain transfer agent is used in the suspension step, the subsequent emulsion polymerization provides the stability of the final material.

In U.S. Pat. No. 4,952,650, the polymerization of large size, nontacky beads that are subsequently extruded into permanent film adhesives is described. In this disclosure styrene sulfonic acid or the sodium salt thereof is in a general listing of monomers, however it is not used in the examples or said to provide novel properties of the material.

Other investigators have prepared polyacrylate beads for use in microporous sorbents as binding agents. A polyacrylate polymer product comprising (a) a suspension stabilizer modifier having a metal cation and (b) a copolymer of acrylic acid ester of a non-tertiary alcohol having 1 to 14 carbon atoms, a polar monomer, and at least one of the following: a higher vinyl ester, styrene sulfonate salt, multivinyl monomer, and α, β-ethylenically unsaturated poly (alkyleneoxy) is exemplified. The use of suspension stabilizers such as zinc oxide and colloidal silica, as described, are known to suppress the adhesion characteristics of the resulting polymer. In addition very high levels (approximately 5.5% by weight to monomer) of the surfactant and styrene sulfonate salt are used. Again such excessive levels are detrimental to adhesion characteristics and would limit the utility of these polymeric beads as repositionable adhesives.

It has now been discovered that microspheres that contain vinyl unsaturated additives with both an ionic and hydrophobic moiety to enhance stability and performance properties, while maintaining inherent tackiness, elastomeric properties and solvent or water dispersibility.

SUMMARY OF THE INVENTION

Advantageously, the present invention provides a microsphere adhesive that enhances adhesion by avoiding microsphere surface contaminants, without changing the physical morphology of the microsphere, or by co-polymerizing a secondary polymer reaction. Uniquely, the microspheres of the present invention are prepared with the use of specialty ionic monomers that serve not only as a stabilizer but enhance the performance properties of the resulting adhesive.

This invention provides pressure sensitive adhesive microspheres that contain vinyl unsaturated additives with both an ionic and hydrophobic moiety to enhance stability and performance properties. Furthermore, these adhesive microspheres adhere to substrates, remove cleanly and are able to be reapplied multiple times if desired. Even with enhanced adhesion the adhesive microspheres of the present invention adhere non-destructively to fragile surfaces such as paper.

In particular, the present invention provides an adhesive microsphere composition comprising:

(a) a plurality of polymeric, elastomeric microspheres wherein the microspheres are the reaction product of reactants comprising polymerizable starting materials comprising at least one $C_4$–$C_{14}$ alkyl (meth)acrylate monomer and optionally at least one comonomer, (b) from 0.1 to 3 parts by weight of at least one vinyl-unsaturated additive having both an ionic moiety and a hydrophobic moiety and containing at least 5 but not more than 40 carbon atoms, preferably about 0.5 to about 3 parts by weight of the microspheres;

(c) optionally, a polymeric stabilizer in an amount of between about 0.1 and about 3 parts by weight per 100 parts by weight of the microspheres, preferably about 0.1 to about 1.5 parts by weight per 100 parts by weight of the microspheres;

(d) a surfactant in an amount of no greater than about 5 parts by weight per 100 parts by weight of the microspheres, preferably no greater than 3 parts by weight and most preferably in the range of 0.2 to about 1.5 parts by weight per 100 parts by weight of the microspheres;

(e) optionally a modifier, wherein the modifier can be at least one of a chain transfer agent, a tackifier, a solvent or the like in an amount that is sufficient to provide microspheres with a solvent soluble portion in the range of 30–98%, preferably in the range of 40–95%, wherein the solvent is n-heptane; and (f) an initiator in an amount effective to catalyze the polymerization reaction present in amounts ranging from about 0.1 to approximately 2 parts by weight per 100 parts by weight of the polymerizable monomer starting material.

As used in this application, the notation "(meth)acrylate" refers to acrylate and methacrylate.

The vinyl-unsaturated additive having both an ionic moiety and a hydrophobic moiety and containing at least 5 but not more than 40 carbon atoms improves the stability of the suspension polymerization process resulting in little coagulation when compared to the formulations not containing it. In addition the use of the vinyl-unsaturated additive results in enhanced adhesive performance. Furthermore high solids content, stable suspension polymerizations can now be made.

A modifier may be used to regulate the solvent soluble portion of the microspheres and it is added to the polymerization mixture in an amount sufficient to provide a solvent soluble portion that is in the range of 30–98%, preferably in the range of 40–95%. Various modifiers may be used within the scope of this invention and the amounts used are those that sufficiently provide the microspheres with a solvent soluble portion. Such amounts would range, for example for solvents from 1–30%, for tackifiers from 1–30% and for chain transfer agents, up to about 0.15%.

Particularly useful modifiers are chain transfer agents. To control the molecular weight of the polymer being formed in the microsphere a chain transfer agent or modifier is used. Many halogen-and sulfur-containing organic compounds function well as chain transfer agents in free radical polymerizations. Non-limiting examples of such agents are: carbon tetrabromide, carbon tetrachloride, dodecanethiol, iso-octylthioglycolate, butyl mercaptan, and tertiary-dodecyl mercaptan. Particularly useful chain transfer agents are long chain mercaptans, such as dodecanethiol. The amount of chain transfer agent suitable for microsphere polymerizations is calculated on a weight basis to the entire polymerizable content. The chain transfer agent is preferably added at up to about 0.15%, more preferably up to about 0.12% and most preferably up to about 0.08%. These levels are adequate to provide a solvent soluble polymer component in the microsphere of up to about 98%.

Other useful modifiers are solvents. Examples of which are but not limited to: aliphatic or aromatic solvents such as heptane, benzene, toluene and the like; alcohols such as methanol, isopropyl alcohol, and the like; and ketones such as acetone, methyl ethyl ketone and the like. The amount of solvent suitable for microsphere polymerizations is calculated on a weight basis to the entire polymerizable content. The solvent is preferably added at up to about 30%, more preferably up to about 15% and most preferably up to about 5%. These levels are adequate to provide a solvent soluble polymer component in the microspheres of up to about 98%.

Still other useful modifiers include tackifiers and/or plasticizers. Examples of which are but not limited to: hydrogenated rosin esters commercially available from such companies as Hercules, Inc. under the tradenames of Foral™, Regalrez® and Pentalyn™. Tackifying resins also include those based on t-butyl styrene. Useful plasticizers include but are not limited to dioctylphthalate, 2-ethylhexyl phosphate, tricresyl phosphate, mineral oil and the like. The tackifier and/or plasticizer are preferably added at up to about 30%, more preferably up to about 15% and most preferably up to about 5%. These levels provide a solvent soluble polymer component in the microsphere of up to about 98%.

In another aspect of the present invention a one step suspension polymerization process is provided for preparing polymeric elastomeric microspheres comprising the steps of:

(a) stirring or agitating a mixture comprising polymerizable monomer starting materials comprising:

(i) at least one $C_4$–$C_{14}$ alkyl (meth)acrylate monomer and, optionally at least one comonomer;

ii) from 0.1 to 5 parts by weight of at least one vinyl-unsaturated additive having both an ionic moiety and a hydrophobic moiety and containing at least 5 but not more than 40 carbon atoms, (iii) an initiator for the polymerizable monomer starting materials present in amounts ranging from 0.1 to approximately 2 parts per weight per 100 parts by weight of the polymerizable monomer starting materials;

(iv) optionally, a polymeric stabilizer in an amount in the range of 0.1 to about 3 parts by weight per 100 parts by weight of the polymerizable monomer starting materials;

(v) a surfactant in an amount no greater than about 5 parts by weight per 100 parts by weight of polymerizable monomer, preferably no greater than about 3 parts by weight and most preferably in the range of 0.5 to 1.5 parts by weight;

(vi) water to form an oil in water suspension; and (vii) optionally a modifier in an amount sufficient to provide a solvent soluble portion in the range of 30–98%; and (b) polymerizing the (meth)acrylate monomer(s) and the comonomer(s), if present; wherein microspheres are provided.

In yet another aspect, the present invention provides a two-step suspension polymerization process for preparing polymeric elastomeric microspheres from polymerizable monomer stating materials, wherein the process comprising the steps of:

(a) stirring or agitating a mixture comprising:

(i) at least one $C_4$–$C_{14}$ alkyl (meth)acrylate monomer;

(ii) from 0.1 to 5 parts by weight of at least one vinyl-unsaturated additive having both an ionic moiety and a hydrophobic moiety and containing at least 5 but not more than 40 carbon atoms, (iii) an initiator for the monomer present in amounts ranging from 0.1 to approximately 2 parts per weight per 100 parts by weight of the polymerizable monomer starting materials;

(iv) optionally, a polymeric stabilizer in an amount in the range of 0.1 to about 3 parts by weight per 100 parts by weight of the polymerizable monomer starting materials;

(v) a surfactant in an amount of no greater than about 5 parts by weight per 100 parts by weight of the polymerizable monomer starting materials, preferably no greater than 3 parts by weight and most preferably in the range of 0.5 to 2 parts by weight;

(vi) optionally a modifier in an amount sufficient to provide a solvent soluble portion in the range of 30–98%; and (vii) water to form an oil in water suspension;

(b) at least partially polymerizing the polymerizable monomer starting materials;

(c) adding to the suspension at least one comonomer; and (d) continuing the polymerization of the polymerizable monomer starting materials; wherein microspheres are provided.

The present invention also provides in another aspect a sheet material comprising a backing and a coating of repositionable pressure sensitive adhesive described above is coated on at least one portion of at least one major surface.

Several features of the adhesive of the present invention provide a number of desirable advantages that have heretofore been unavailable. For example several advantages include, (a) improved adhesion to various surfaces (bond paper, fabric, wood, painted surfaces, glass, vinyl, etc), (b) adhesive microspheres which can be prepared at high solids (55% or greater) without large amounts of coagulum, (c) adhesive microspheres which are more stable to coagulation or agglomeration, and (d) adhesive microspheres that adhere to a substrate or backing and easily removes from applied surfaces without transferring or leaving an adhesive residue on the applied surface.

Further, the present invention provides a microsphere-based pressure sensitive adhesive having a high solvent soluble fraction that adheres to rough surfaces such as fabric, removes cleanly, and exhibits the ability to be reapplied multiple times if desired. Even with this enhanced adhesion to rough surfaces the adhesive microspheres will still adhere non-destructively to fragile surfaces such as paper. Furthermore, the adhesive microspheres of this invention is prepared according to resource efficient methods.

DESCRIPTION OF THE PREFERRED EMBODIMENTS(s)

The microspheres obtained in the present invention are the reaction product of (a) at least one alkyl (meth)acrylate ester wherein the alkyl group contains four to about 14 carbon atoms, preferably four to about 10 carbon atoms, (b) optionally, a comonomer, (c) at least one vinyl-unsaturated additive having both an ionic moiety and a hydrophobic moiety and containing at least 5 but not more than 40 carbon atoms, and (d) optionally, a modifier in an amount sufficient to provide a solvent soluble portion in the range of 30–98%.

The comonomer (b), if present may be nonpolar, ionic, polar or mixtures of such monomers.

Useful alkyl (meth)acrylate monomers are those monofunctional unsaturated (meth)acrylate esters, the alkyl groups of which have from 4 to 14 carbons atoms. Such (meth)acrylates are oleophilic, water dispersible, and are essentially water insoluble. Furthermore, useful (meth) acrylates are those that as homopolymers, generally have a glass transition temperature below about −20° C., or if a combination of monomers is used, such a combination would produce a copolymer or terpolymer generally having a glass transition temperature below about −20° C. Nonlimiting examples of such (meth)acrylates included but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, t-butyl acrylate, t-butyl methacrylate, isobornyl acrylate, methylmethacrylate, isononyl acrylate, isodecyl acrylate and the like, and the combination thereof.

Preferred alkyl (meth)acrylate monomers include isooctyl acrylate, isononyl acrylate, isoamyl acrylate, isodecyl acrylate, 2-ethylhexyl acrylate, n-butyl acrylate, sec-butyl acrylate and mixtures thereof.

Vinyl ester monomers suitable for use in the present invention include but are not limited to: vinyl 2-ethylhexanoate, vinyl capriate, vinyl laurate, vinyl pelargonate, vinyl hexanoate, vinyl propionate, vinyl decanoate, vinyl actanoate, and other monofunctional unsaturated vinyl esters of linear or branched carboxylic acids comprising 1 to 14 carbon atoms, which as homopolymers have glass transition temperatures below about −10° C. Preferred vinyl ester monomers include vinyl laurate, vinyl capriate, vinyl 2-ethylhexanoate, and mixtures thereof.

Additional other vinyl monomers which, as homopolymers, have glass transition temperatures higher than about −10° C. to 0° C., such as vinyl acetate, acrylonitrile, styrene, mixtures thereof and the like, may optionally be utilized in conjunction with one or more of the acrylate, methacrylate and vinyl ester monomers provided the glass transition temperature of the resultant polymer is below about −10° C.

Suitable vinyl-unsaturated additives having both an ionic moiety and a hydrophobic moiety and containing at least 5 but not more than 40 carbon atoms include: the salts of sulfoesters of alpha-methylene carboxylic acids such as 2-sulfoethyl acrylate, 2-sulfoethyl methacrylate, 2-sulfoethyl α-ethylacrylate, 2-sulfoethyl α-hexylacrylate, 2-sulfoethyl α-cyclohexylacrylate, 2-sulfoethyl α-chloroacrylate, 2-sulfo-1-propyl acrylate, 2-sulfo-1-butyl acrylate and methacrylate, 3-sulfo-2-butyl acrylate and methacrylate, 2-methyl-1-sulfo-2-propyl acrylate and methacrylate, 3-bromo-2-sulfo-1-propyl acrylate, 3-chloro-2-sulfo-1-propyl acrylate, 3-chloro-2-sulfo-1-butyl acrylate, 3-methoxy-2-sulfo-1-propyl acrylate, 2-sulfo-cyclohexyl acrylate, 2-phenyl-2-sulfoethyl acrylate, 4-sulfo-1-butyl acrylate, 6-(sulfophenoxy) hexyl acrylate and methacrylate. The preparation of such materials is disclosed in U.S. Pat. No. 3,024,221, the disclosure of which is incorporated herein by reference.

The salts of sulfato-esters of alpha-methylene carboxylic acids including 3-sulfato-2-hydroxy-1-propyl methacrylate.

The salts of carboxy-terminated alkyl esters of alpha-methylene carboxylic acids including 11-methacryloxyundecanoic acid.

The salts of sulfoalkyl allyl ethers including 3-sulfo-2-hydroxy-1-propyl allyl ether.

The salts of acrylamide alkane sulfonates including 2-acrylamido-2-methyl propane sulfonates.

The salts of vinyl alkyl phosphonate esters including vinyl octyl phosphonates.

The salts of vinyl aryl sulfonates including para-styrene sulfonates.

Typically the vinyl-unsaturated additive having both an ionic moiety and a hydrophobic moiety is present in relative amounts by weight of the total polymerizable content from about 0.1 to about 3 parts and preferably from about 0.5 to about 3 parts.

Suitable comonomers include nonpolar, ionic, polar monomers and mixtures thereof. In addition to using one or more acrylate monomers as a comonomer, as described above, the following are non-limiting examples of comonomers:

(A) ionic comonomers, such as sodium methacrylate, ammonium acrylate, sodium acrylate, (I) trimethylamine p-vinyl benzimide, (II) 4,4, 9-trimethyl-4-azonia-7-oxo-8-oxa-dec-9-ene-1-sulphonate, (III) N,N-dimethyl-N-(β-methacryloxyethyl) ammonium propionate betaine, (IV) trimethylamine methacrylimide, (V) 1,1-dimethyl- 1(2,3-dihydroxypropyl)amine methacrylimide; any zwitterionic monomer and the like;

(B) non-polar comonomers include but are not limited to, 4-methyl-2-pentyl acrylate, 2-methylbutyl acrylate, isoamyl acrylate, sec-butyl acrylate, n-butyl acrylate, isodecyl methacrylate, t-butyl acrylate, t-butyl methacrylate, isobornyl acrylate, octyl acrylamide, methylmethacrylate, isononyl acrylate, isodecyl acrylate, styrene and the like, and the combination thereof.

(C) polar comonomers may or may not contain a dissociable hydrogen. Examples of suitable polar comonomers include organic carboxylic acids comprising 3 to about 12 carbon atoms and having generally 1 to about 4 carboxylic acid moieties. Nonlimiting examples of such monomers acrylic acid, methacrylic acid, itaconic acid, fumaric acid, crotonic acid, maleic acid, β-carboxyethylacrylate and the like. In addition suitable polar comonomers include acrylamide, methacrylamide, 2-hydroxyethyl acrylate, and the like.

In addition, one class of suitable comonomers are aminofunctional monomers having a nucleus or portion of the nucleus of the general formula (a):

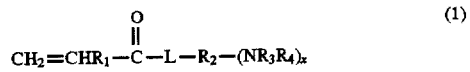

$$CH_2=CHR_1-\overset{O}{\underset{\|}{C}}-L-R_2-(NR_3R_4)_x \qquad (1)$$

wherein $R_1$ is —H,—$CH_3$,—$CH_2CH_3$, cyano or carboxymethyl;

$R_2$ is a hydrocarbyl radical comprising 1 to about 12 carbon atoms;

$R_3$ and $R_4$ are independently H or an alkyl group containing 1 to about 12 carbon atoms or an arylalkyl group or together form a cyclic or heterocyclic moiety;

L is carbon—carbon bond, O, NH or S; and x is an integer of 1 to 3.

Nonlimiting examples of comonomers according to formula (1) include N, N-dimethyl-aminoethyl(methyl) acrylate, N,N-dimethylaminopropyl-(meth)acrylate, t-butylaminoethyl(methyl)acrylate and N,N-diethylaminoacrylate.

Another class of suitable comonomers are comonomers having a nucleus or portion of the nucleus of the general formula (2):

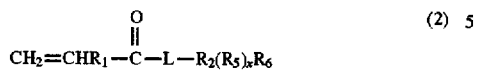

wherein $R_1$ is H,—$CH_3$,—$CH_2CH_3$, cyano or carboxymethyl;

$R_2$ is a hydrocarbyl radical comprising 1 to about 12 carbon atoms;

$R_5$ is —O—, alkylene oxide comprising 1 to 5 carbon atoms, or phenoxy oxide, wherein the alkylene oxide would include, —$CH_2O$—,—$CH_2CH_2O$—, —$CH_2$(CH)$CH_3O$—, and the like;

$R_6$ is H,—$C_6H_4OH$, or —$CH_3$

L is a carbon—carbon bond, O, NH or S; and x is an integer with the proviso that when $R_5$ is —O—, x is an integer of 1-3.

Nonlimiting examples of comonomers according to formula (2) include hydroxyethyl (meth)acrylate, glycerol mono(meth)acrylate and 4-hydroxybutyl (meth)acrylate, acrylate terminated pol(ethylene oxide); methacrylate terminated poly(ethylene oxide); methoxy poly(ethylene oxide) methacrylate; butoxy poly(ethylene oxide) methacrylate; acrylate terminated poly(ethylene glycol); methacrylate terminated poly(ethylene glycol); methoxy poly(ethylene glycol) methacrylate; butoxy poly(ethylene glycol) methacrylate and mixtures thereof.

Yet another class of suitable comonomers are amidofunctional monomers having a nucleus or portion of the nucleus of the general formula (3):

wherein $R_1$ is H,—$CH_3$,—$CH_2CH_3$, cyano or carboxymethyl; and $R_3$ $R_4$ are independently H or an alkyl group containing 1 to about 12 carbons or an arylalkyl group or together form a cyclic or heterocyclic moiety.

Nonlimiting examples of comonomers according to formula (3) include N-vinyl pyrrolidone, N-vinyl caprolactom acrylamide or N, N-dimethyl acrylamide.

Nonlimiting examples of other suitable comonomers that do not fall within the above classes but are within the scope of permissible comonomers include (meth)acrylonitrile, furfuryl (meth)acrylate and tetrahydrofurfuryl (meth)acrylate, 2-vinyl pyridine, and 4-vinyl pyridine.

Typically, when a comonomer is present, the relative amounts by weight of the alkyl (meth)acrylate monomer(s) and the comonomer is in the range of about 99.5/0.5 to 75/25, and preferably is in the range of 98/2 to 92/8.

A modifier may be used to regulate the solvent soluble portion of the microspheres and it is added to the polymerization mixture in an amount sufficient to provide a solvent soluble portion that is in the range of 30–98%, preferably in the range of 40–95%. Various modifiers may be used within the scope of this invention and the amounts used are those that sufficiently provide the microspheres with a solvent soluble portion. Such amounts would range, for example for solvents from 5–30%, for tackifiers and/or plasticizers from 1–30% and for chain transfer agents, up to about 0.15%.

Particularly useful modifiers are chain transfer agents. To control the molecular weight of the polymer being formed in the microsphere it is desirable to use a chain transfer agent or modifier. Many halogen- and sulfur-containing organic compounds function well as chain transfer agents in free radical polymerizations. Non-limiting examples of such agents are: carbon tetrabromide, carbon tetrachloride, dodecanethiol, iso-octylthioglycolate, butyl mercaptan, and tertiary-dodecyl mercaptan. In this invention it is efficacious to employ long chain mercaptans such as dodecanethiol. The amount of chain transfer agent suitable for these microsphere polymerizations is calculated on a weight basis to the entire polymerizable content. The chain transfer agent is preferably added at up to about 0.15% more preferably up to about 0.12% and most preferably up to about 0.08%. These levels are adequate to provide a soluble polymer content in the microsphere of up to about 98%.

The adhesive microspheres composition may also contain a crosslinking agent. Examples of useful crosslinking agents include, but are not limited to: multifunctional (meth)acrylate(s), e.g., butanediol diacrylate or hexanediol diacrylate or other multifunctional crosslinkers such as divinylbenzene and mixtures thereof. When used, crosslinker(s) is (are) added at a level of up to about 0.15 equivalent weight percent, preferably up to about 0.1 equivalent weight percent, of the total polymerizable composition with the proviso that the combination of crosslinking agent and modifier concentrations are chosen to obtain a microsphere with 30 to 98% solvent soluble portion.

The adhesive microspheres of the present invention are prepared by suspension polymerization using either a one-step or two-step process as described in detail below. Suspension polymerization is a procedure wherein a monomer is dispersed in a medium (usually aqueous) in which it is insoluble. The polymerization proceeds within the individual polymer droplets. Monomer soluble free-radical initiators are preferably used. The kinetics and the mechanism are those for the corresponding bulk polymerization under similar conditions of temperature and initiator concentration.

Initiators affecting polymerization are those that are normally suitable for free-radical polymerization of acrylate monomers. Examples of such initiators include thermally-activated initiators such as azo compounds, hydroperoxides, peroxides and the like and photoinitiators such as benzophenone, benzoin ethyl ether and 2,2-dimethoxy-2-phenyl acetophenone. Other suitable initiators include lauroyl peroxide and bis(t-butyl cyclohexyl)peroxy dicarbonate. The initiator or mixture of initiators are present in a catalytically effective amount sufficient to bring about high monomer conversion in a predetermined time span and temperature range. Typically, the initiator is present in amounts ranging from 0.1 to approximately 2 parts per weight per 100 parts by weight of the polymerizable monomer starting materials.

Parameters that affect the concentration of initiator employed include the type of initiator and particular monomer and/or monomers involved. In addition mixtures of initiators may be used to control the rate of the polymerization reaction. It is believed that catalytically effective concentrations range from about 0.02 to about 2 percent by weight of the total monomers and more preferably, from about 0.20 to about 0.70 percent by weight monomers and/or monomers.

Optionally, a polymeric stabilizer may be used. Advantageously, the presence of the stabilizer permits the use of relatively low amounts of surfactant while still obtaining microspheres.

Any polymeric stabilizer that effectively provides sufficient stabilization of the final polymerized droplets and prevents agglomeration within a suspension polymerization process is useful in the present invention. When used, a polymeric stabilizer will typically be present in the reaction mixture in an amount by weight of about 0.1 to about 3 parts by weight per 100 parts of polymerizable monomer, and more preferably will be present in an amount by weight of about 0.1 to about 1.5 parts by weight per 100 parts of polymerizable monomer.

Exemplary polymeric stabilizers include salts of polyacrylic acids of greater than 5000 molecular weight average (for example, ammonium, sodium, lithium and potassium salts), carboxy modified polyacrylamides (for example, Cyanamer™ A-370 from American Cyanamid), copolymers of acrylic acid and dimethylaminoethylmethacrylate and the like, polymeric quaternary amines (for example, General Analine and Film's Gafquat™ 755, a quaternized polyvinylpyrollidone copolymer, or Union Carbide's "JR-400", a quaternized amine substituted cellulosic), cellulosics, carboxy-modified cellulosics (for example, Hercules' Natrosol™ CMC Type 7L, sodium carboxy methycellulose), and polyvinyl alcohols.

Surfactants will typically be present in the reaction mixture in an amount of no greater than about 5 parts by weight per 100 parts by weight of polymerizable monomer, preferably no greater than about 3 parts by weight, and most preferably in the range of 0.2 to 1.5 parts by weight per 100 parts by weight of polymerizable monomer.

Useful surfactants (also known as emulsifiers) include anionic, cationic, or nonionic surfactants and include but are not limited to anionic surfactants, such as alkylarylether sulfates and sulfonates such as sodium alkylarylether sulfate, e.g., Triton™ X200, available from Rohm and Haas, alkylarylpolyether sulfates and sulfonates such as alkylarylpoly(ethylene oxide) sulfates and sulfonates, preferably those having up to about 4 ethyleneoxy repeat units, and alkyl sulfates and sulfonates such as sodium lauryl sulfate, ammonium lauryl sulfate, triethanolamine lauryl sulfate, and sodium hexadecyl sulfate, alkyl ether sulfates and sulfonates such as ammonium lauryl ether sulfate, and alkylpolyether sulfate and sulfonates such as alkyl poly (ethylene oxide) sulfates and sulfonates, preferably those having up to about 4 ethyleneoxy units. Alkyl sulfates, alkyl ether sulfates, and alkylarylether sulfates are preferred. Additional anionic surfactants can include, for example, alkylaryl sulfates and sulfonates, for example sodium dodecylbenzene sulfate and sodium dodecylbenzene sulfonate, sodium and ammonium salts of alkyl sulfates, for example sodium lauryl sulfate, and ammonium lauryl sulfate; nonionic surfactants, such as ethoxylated oleoyl alcohol and polyoxyethylene octylphenyl ether; and cationic surfactants, such as a mixture of alkyl dimethylbenzyl ammonium chlorides wherein the alkyl chain contains from 10 to 18 carbon atoms. Amphoteric surfactants are also useful in the present invention and include for example sulfobetaines, N-alkylaminopropionic acids, and N-alkylbetaines.

To initiate the polymerization reaction, a sufficient number of free radicals must be present. This may be achieved through several means that are well known in the art, such as heat or radiation free-radical initiation. For example, heat or radiation can be applied to initiate the polymerization of the monomers, which is an exothermic reaction. However, it is preferred to apply heat until thermal decomposition of the initiators generates a sufficient number of free radicals to begin the reaction. The temperature at which this occurs varies greatly depending upon the initiator used.

In addition, deoxygenation of the polymerization reaction mixture is often desirable. It is well known that oxygen dissolved in the reaction mixture can inhibit polymerization and it is desirable to expel this dissolved oxygen. Although, an inert gas bubbled into the reaction vessel or through the reaction mixture is an effective means of deoxygenation, other techniques for deoxgenation that are compatible with suspension polymerization can be used. Typically, nitrogen is used to deoxygenate, although any of the Group VIIIA (CAS version) inert gases are also suitable.

While specific time and stirring speed parameters are dependent upon the types of monomers and initiators used, it is desirable to predisperse the reaction mixture until the reaction mixture reaches a state where the average monomer droplet size is between about 1 µm and 300 µm and preferably between 20 µm and 70 µm. The average particle size tends to decrease with increased and prolonged agitation of the reaction mixture.

Preferably, stirring and nitrogen purge are maintained throughout the reaction period. Initiation is begun by heating the reaction mixture. Following polymerization, the reaction mixture is cooled.

In a one-step process both the alkyl (meth)acrylate monomer and any optional comonomers are present together in the suspension at the initiation of polymerization. In a two-step process any optional comonomer is typically added after the initial exotherm resulting from polymerization of the alkyl (meth)acrylate monomer has peaked, but could be added at any point after polymerization has started. The other components, such as the initiator, stabilizers (if used), surfactants and modifiers are present in the reaction mixture as described in the processing steps herein above.

Following polymerization, a stable aqueous suspension of microspheres at room temperature is obtained. The suspension may have non-volatile solids contents of from about 10 to about 70 percent by weight. Upon prolonged standing, the suspension typically separates into two phases, one phase being an aqueous, essentially polymer microsphere-free phase and the other phase being an aqueous suspension of the polymeric microspheres, that is, the microsphere-rich phase. The aqueous suspension of microspheres may be utilized immediately following polymerization, because the suspension of microspheres of the present invention is particularly stable to agglomeration or coagulation. Advantageously, the microspheres of the present invention can be easily coated from an aqueous solution. Surprisingly, the microspheres of the present invention are well suited for conventional coating techniques and have enhanced fluid processing characteristics.

The microsphere-rich phase can be diluted with an additional amount of water or solvent, or redispersed upon shaking or other means of agitation. Generally, this aqueous suspension can be coated onto a backing or other substrate being employed using conventional coating methods, such as slot die coating, to provide an adhesive coating. The microspheres can be compounded with various rheology modifiers and/or latex adhesives or "binders". Typically, the adhesive coating which, when dried, exhibits a dry coating weight in the range of 0.2 to about 2 grams per square foot to provide an adhesive-coated sheet material in which the adhesive coating comprises polymeric microspheres, surfactant, and optionally polymeric stabilizers, rheology modifiers, and/or latex adhesives. Alternatively, the microspheres may be isolated and combined with an organic solvent if desired prior to coating them onto the backing.

Properties of the adhesive microspheres of the present invention can be altered by the addition of a tackifying resin(s) and/or plasticizer(s) after the polymerization. Preferred tackifiers and/or plasticizers for use herein include hydrogenated rosin esters commercially available from such companies as Hercules, Inc. under the trade names of Foral™, Regalrez® and Pentalynr™. Tackifying resins also include those based on t-butyl styrene. Useful plasticizers include, but are not limited to: dioctyl phthalate, 2-ethylhexyl phosphate, tricresyl phosphate and the like. If such tackifiers and/or plasticizers are used, the amounts used in the adhesive mixture are amounts effective for the known uses of such additives.

Optionally, adjuvants, such as, rheology modifiers, colorants, fillers, stabilizers, pressure-sensitive latex binders and various other polymeric additives can be utilized. If such adjuvants are used, the amounts used in the adhesive mixture are amounts effective for the known uses of such adjuvants.

Backings used as substrates for adhesive articles may be materials that are conventionally used as a tape backing or may be of other flexible material. Such backings include, but are not limited to, those made from materials selected from the group consisting of poly(propylene), poly(ethylene), poly(vinyl chloride), polyester (e.g., poly(ethylene terephthalate), such as those available under the trade designation of "Scotch" film 8050 from 3M), polyamide films such as that available from DuPont Co., Wilmington, DE, under the trade designation "KAPTON," cellulose acetate, and ethyl cellulose. Backings may also be of woven fabric formed from threads of synthetic or natural materials such as cotton, nylon, rayon, glass, or ceramic material, or they may be of nonwoven fabric such as air laid webs of natural or synthetic fibers or blends of these. In addition, the backing may be formed of materials selected from the group consisting of metal, metallized polymeric film, and ceramic sheet material.

Preferred such materials include, but are not limited to, plastics such as polyethylene, polypropylene, polyesters, cellulose acetate, poly(vinyl chloride), and poly(vinylidine fluoride), as well as paper or other substrates coated or laminated with such plastics. These coated papers or thermoplastic films are often siliconized or otherwise treated to impart improved release characteristics. One or both sides of the backings or liners could have such release characteristics. Generally the backing or substrate material is about 50 µm to about 155 µm in thickness, although thicker and thinner backing or substrate materials are not precluded.

Particularly useful articles prepared using the adhesive microspheres of the present invention include repositionable adhesive products such as repositionable note and paper products, repositionable tape and tape flags, easel sheets, repositionable glue stick and the like, but may also include other non-repositioniable industrial commercial, and medical adhesive products.

The present invention is further illustrated by the following examples, but the particular materials and amounts thereof recited in these examples, as well as other conditions and details, should not be construed to unduly limit this invention. All materials are commercially available or known to those skilled in the art unless otherwise stated or apparent. The following examples are illustrative in nature and are not intended to limit the invention in any way. All percentages listed in the Tables that follow are calculated on a weight basis to total monomer and vinyl unsaturated additive content.

EXAMPLES

Test Methods
Solvent Soluble Polymer Content

To determine the solvent soluble content of the prepared microspheres, the following process is used.

One gram of the water suspension of microspheres is dried in a vacuum oven without heat. After drying, 100 ml of n-heptane is added and shaken for 24 hours. After shaking, the dispersion is poured through a filter paper (30 micrometer pores) to remove the non-soluble content. The filtrate is then dried in a 100° F. oven.

The weight of the dried filtrate divided by the dried suspension microspheres is the % solvent soluble polymer content. The test is repeated and the data is reported as the average of the number of trials.

Adhesive Microspheres Coating

A coating of the adhesive microspheres samples is made by allowing the suspension to cream. The cream (the microsphere-rich phase) is then coated through a 1 mil gap (25 micrometer) onto 62.5 micrometer matte polyester film (available from the 3M company as Scotch 8050).

Peel Adhesion to Bond Paper

Peel adhesion is the force required to remove a coated sheet from a bond paper substrate at a specific angle and rate of removal. In the examples this force is expressed in grams per one inch width of coated sheet. The procedure followed is:

A strip, one inch wide, of coated sheet is applied to the horizontal surface of 9.1 kilogram bond paper (21.8 cm.× 28.2 cm). A 2.04 kilogram hard rubber roller is used to firmly apply the strip to the bond paper. The free end of the coated sheet is attached to the adhesion tester load cell such that the angle of removal will be 90 degrees. The test plate is then clamped in the jaws of the tensile testing machine which is capable of moving the plate away from the load cell at a constant rate of 30.8 centimeters per minute. A load cell reading in grams per inch of coated sheet is recorded. The samples are tested three times. The average value of the three tests is reported.

GLOSSARY

AA—acrylic acid
AmA—ammonium acrylate
ACM—acrylamide
HEMA—hydroxyethyl methacrylate
IOA—isooctyl acrylate
IPA—isopropyl alcohol
NVP—N-vinyl pyrrolidone
RH—relative humidity
NaSS—sodium styrene sulfonate
AMPS—2-acrylamido-2-methylpropanesulfonate (ammonium salt)
OAcM—N-tertiary octyl acrylamide
DMAM—1,1-dimethyl-1(2-hydroxypropyl)amine methacrylimide
PTSAN—para-toluene sulfonic acid (sodium salt)
Lucido 75—benzoyl peroxyde with 25% water.

Example 1

To a two liter, three necked flask equipped with a thermometer mechanical stirrer and nitrogen inlet tube was charged 602.75 gm of deionized water, 35 gm of a 10% solids solution of Stepanol AMV (trade name for a 28% solids solution of ammonium lauryl sulfate commercially available from Stepan Company), 17.5 gm of a 10% solids solution of Goodrite K702 (trade name for a 25% solids solution of polyacrylic acid, 240,000 weight average molecular weight, commercially available from B.F. Goodrich Company) which had been neutralized to a pH of 7.0 with concentrated ammonium hydroxide, and 2.63 gm sodium styrene sulfonate. To this solution was added 347.37 gm of isooctyl acrylate and 1.05 gm of Perkadox 16N (trade name for a 95% active bis (4-tert-butylcyclohexyl) peroxydicarbonate initiator commercially available from AKZO Chemicals Inc.) The agitation rate was set at 400 revolutions per minute (RPM), and the reaction mixture was heated to 50° C., and purged with nitrogen. The stirring, and nitrogen purge was maintained throughout the reaction period. The reaction was initially set at 50° C. exothermed after a few minutes and peaked at 77° C. The batch was maintained at 50° C. for 22 hours, cooled and filtered through a cheese cloth. The weight of the coagulum collected on the cheese cloth was measured and reported as % coagulum by weight to monomer and vinyl-unsaturated additive content. The particle size was 36 µm.

Example 2–8

The examples were prepared according to the procedure described in Example 1 except that the type and amount of emulsifier monomer, the amount of dodecanethiol and the amount and type of comonomer was changed. The formulations and test results are summarized in Tables 1 and 2 below.

TABLE 1

| Example | Vinyl-unsaturated additive | Comonomer | % Dodecanethiol |
|---|---|---|---|
| 1 | 0.75% NaSS | None | 0 |
| 2 | 0.75% AMPS | None | 0 |
| 3 | 1.5% AMPS | None | 0 |
| 4 | 1% NaSS | 2% NVP | 0.04 |
| 5 | 0.75% NaSS | 2% HEMA | 0.02 |
| 6 | 1% NaSS | 2% AcM | 0.05 |
| 7 | 1% NaSS | 12% OAcM | 0 |
| 8 | 1% NaSS | 12% OAcM | 0.02 |

TABLE 2

| Example | Adhesion to Bond Paper | % Coagulum | Particle Size (µm) | % Solvent Soluble Portion |
|---|---|---|---|---|
| 1 | 199 | 0.02 | 36 | 7 |
| 2 | NA | 100 | NA | NA |
| 3 | 187 | 0.05 | 65 | 10 |
| 4 | 190 | 0.04 | 40 | 51 |
| 5 | 277 | 0.06 | 54 | 26 |
| 6 | 456 | 0.04 | 47 | 70 |
| 7 | 190 | 0.02 | 35 | 15 |
| 8 | 184 | 0.03 | 34 | 21 |

Comparative Examples C1–C9

These examples were prepared according to the procedure described in Example 1 except the vinyl-unsaturated additive was omitted. The formulations and test results are summarized in Tables 3 and 4 below.

TABLE 3

| Example | Comonomer | % Dodecanethiol |
|---|---|---|
| C1 | None | 0 |
| C2 | 0.75% DMAM | 0 |
| C3 | 0.75% AA | 0 |
| C4 | 0.75% AmA | 0 |
| C5 | 1.5% NVP | 0.05 |
| C6 | 1.5% HEMA | 0.03 |
| C7 | 1.5% AcM | 0.05 |
| C8 | 12% OAcM | 0 |
| C9 | 6% OAcM | 0.02 |

TABLE 4

| Example | Adhesion to Bond Paper | % Coagulum | Particle Size (µm) | % Solvent Soluble Portion |
|---|---|---|---|---|
| C1 | NA | 100 | NA | NA |
| C2 | 159 | 0.17 | ~40* | 15 |
| C3 | 170 | 0.02 | 44 | 14 |
| C4 | 205 | 0.03 | 70 | 16 |
| C5 | 476 | 0.19 | 71 | 62 |
| C6 | 417 | 0.19 | 62 | 60 |
| C7 | 262 | 0.06 | 48 | 38 |
| C8 | NA | 100 | NA | NA |
| C9 | NA | 100 | NA | NA |

The results in Tables 1 and 2 show that the samples of this invention with a low level of vinyl-unsaturated additive result in microspheres which have enhanced adhesion to bond paper and are more stable during the polymerization exhibited by lower coagulum levels and are better repositionable adhesives.

The results with the comparative examples made without any vinyl unsaturated additive result in microspheres that entirely coagulate or, at best, have higher levels of coagulum and poorer adhesion to bond paper at comparable % solvent soluble levels.

The examples 1–8 and C1–C9 were prepared at 35% solids.

Comparative Examples C10

Example 1 from the EPO 0,209,337 B1 case was attempted as written in the case. However when 7.5 grams of 1-(3-sulphopropyl)-2-vinyl-pyridinium betaine (SPV) monomer was added to the cosolvent of 27.5 ml. of equal proportions of ethanol/toluene and agitated for two hours, the SPV did not dissolve. Since the example stated that dissolution would occur no further preparation of this example could be accomplished.

Example 9

To a two liter, three necked flask equipped with a thermometer, mechanical stirrer and nitrogen inlet tube was charged 507 gm of deionized water, 27 gm of a 10% solids solution of Stepanol AMV, 16 gm of a 10.7% solids solution of Goodrite K702 which had been neutralized to a pH of 7.0 with concentrated ammonium hydroxide, and 1.125 gm of sodium styrene sulfonate. To this solution was added 450 gm of isooctyl acrylate and 0.698 gm of Perkadox 16N and 0.698 gm of Lucidol 75. The reaction mixture was agitated at 400 RPM, heated to 45° C. and purged with nitrogen. The agitation and nitrogen purge was maintained throughout the reaction period. The reaction exothermed after a few minutes and peaked at 83° C. The batch was maintained at 60° C. for 4 hours, cooled and filtered through a cheese cloth. No coagulum was observed in the flask or on the cheese cloth. Particle size analysis indicated a mean volume diameter of 41 microns.

Examples 10 and 11

Examples 10, 11 and C11–C14 were repeated in a similar manner as that used in Example 9 except that the vinyl-unsaturated additive type and amount and the comonomer type and amount were varied as indicated in Table 5.

TABLE 5

| Example | Vinyl-unsaturated additive | Comonomer | Stability |
|---------|---------------------------|-----------|-----------|
| 9       | 0.25% NaSS                | None      | stable    |
| 10      | 0.1% NaSS                 | None      | agglomerated |
| C11     | None                      | None      | coagulated |
| C12     | None                      | 0.25% AmA | agglomerated |
| C13     | 0.25% PTSAN               | None      | agglomerated |
| C14     | None                      | 0.25% AA  | ~5% coagulum |
| 11      | 0.1% NaSS                 | 0.25% AA  | stable    |

The results in Table 5 show that the sodium styrene sulfonate can stabilize an otherwise unstable one (compare Ex. 11 to C14 and Ex. 9 to C11,C12). Also the nonfunctionalized PTSAN does not exhibit the stabilizing effect that sodium styrene sulfonate does. All samples in Table 5 were made at 45% solids.

Example 12

To a two liter, three necked flask equipped with a thermometer, mechanical stirrer and nitrogen inlet tube was charged 259 gm of deionized water, 21 gm of a 10% solids solution of Stepanol AMV, 6 gm of a 10% solids solution of Goodrite K7200 (trade name for a 40% solids solution of poly(sodium acrylate), 20,000 weight average molecular weight, commercially available from B.F. Goodrich Company), and 3.5 gm of sodium styrene sulfonate. To this solution was added a solution of 329 gm of isooctyl acrylate, 5.25 g of HEMA, 5.25 g of NVP, 7 g of a 1% by weight solution of tert-dodecyl mercaptan dissolved in IOA, 0.123 gm of Perkadox 16N and 0.525 gm of Lucidol 75. The reaction mixture was agitated at 340 RPM, heated to 42° C. and purged with nitrogen. The agitation and nitrogen purge was maintained throughout the reaction period. The reaction exothermed after a few minutes and peaked at 75° C. The batch was maintained at 75° C. for 4 hours, cooled and filtered through a cheese cloth. No coagulum was observed in the flask or on the cheese cloth. Particle size analysis indicated a mean volume diameter of 45 microns. The % solvent soluble portion was 33%.

Example C15

Example C15 was carried out in a similar manner as Example 12 except that the NaSS was replaced with 3.5 g of AA which was subsequently neutralized with ammonium hydroxide to pH 7. Massive coagulation of the suspension occurred during the polymerization. Example C16 was carried out in a similar manner to that of Example 12 except that no NaSS was added. The reaction coagulated.

The results in Table 6 show that microspheres prepared without NaSS were not stable.

TABLE 6

| Example | Vinyl-unsaturated additive | Co-monomer | Co-monomer | Co-monomer | Stability |
|---------|---------------------------|------------|------------|------------|-----------|
| 12      | 1% NaSS                   | 1.5% HEMA  | 1.5% NVP   | None       | stable    |
| C15     | None                      | 1.5% HEMA  | 1.5% NVP   | 1% AmA     | coagulated |
| C16     | None                      | 1.5% HEMA  | 1.5% NVP   | None       | agglomerated |

The results in Table 6 show that without the use of sodium styrene sulfonate the suspension polymerization is not stable. The Ex. 12 and C15,16 were made at 55% solids.

Example 13

Example 13 was prepared at 65% solids. This example illustrates that very high solids, low cost suspensions of adhesive microspheres can be made using the teachings of this invention.

To a two liter, three necked flask equipped with a thermometer, mechanical stirrer and nitrogen inlet tube was charged 160 gm of deionized water, 21 gm of a 10% solids solution of Stepanol AMV, 7.0 gm of a 10% solids solution of Goodrite K7200, and 1.75 gm of sodium styrene sulfonate. To this solution was added a solution of 346.5 gm of isooctyl acrylate, 1.75 g of AA, 0.070 gm of Perkadox 16N and 0.350 gm of Lucidol 75. The reaction mixture was agitated at 300 RPM, heated to 42° C. and purged with nitrogen. The agitation and nitrogen purge was maintained throughout the reaction period. The reaction exothermed after a few minutes an insulated jacket was then placed on the reaction flask. The reaction temperature peaked at 74° C. and the jacket was removed. The batch was maintained at 65° C. for 4 hours, cooled and filtered through a cheese cloth. The suspension filtered slowly (but completely) due to its relatively high viscosity. No coagulum was observed. Particle size analysis indicated a mean volume diameter of 57 micrometers. The % solvent soluble portion was 22%.

Various modifications and alterations of this invention will become apparent to those skilled in the art without departing from the scope and principles of this invention, and it should be understood that this invention should not be unduly limited to the illustrative embodiments set forth herein above. All publications and patents are incorporated herein by reference to the same extent as if each individual publication or patent was specifically and individually indicated to be incorporated by reference.

What is claimed:

1. A stabilized microsphere adhesive composition comprising:
   (a) a plurality of polymeric, elastomeric microspheres wherein the microspheres are the reaction product of reactants comprising polymerizable starting materials comprising at least one $C_4$–$C_{14}$ alkyl (meth)acrylate monomer and optionally at least one comonomer,
   (b) at least one vinyl-unsaturated additive having both an ionic moiety and a hydrophobic moiety and containing at least 5 but not more than 40 carbon atoms in an amount about 0.1 to 3 parts by weight of the microspheres;
   (c) optionally, a polymeric stabilizer in an amount of between about 0.1 and about 3 parts by weight per 100 parts by weight of the microspheres;
   (d) a surfactant in an amount of no greater than about 5 parts by weight per 100 parts by weight of the microspheres;
   (e) optionally a modifier, wherein the modifier is at least one of a chain transfer agent, a tackifier, or a solvent in an amount that is sufficient to provide microspheres with a n-heptane soluble portion in the range of 30–98%; and
   (f) an initiator in an amount effective to catalyze the polymerization reaction present in amounts ranging from about 0.1 to approximately 2 parts by weight per 100 parts by weight of the polymerizable monomer starting material.

2. The stabilized microsphere adhesive composition according to claim 1 wherein the vinyl-unsaturated additive is selected from the group consisting of the salts of sulfoesters of alpha-methylene carboxylic acids, the salts of sulfato-esters of alpha-methylene carboxylic acids, the salts of carboxy-terminated alkyl esters of alpha-methylene carboxylic acids, the salts of sulfoalkyl allyl ethers including 3-sulfo-2-hydroxy-1-propyl allyl ether, the salts of acrylamide alkane sulfonates, the salts of vinyl alkyl phosphonate esters, the salts of vinyl aryl sulfonates and mixtures thereof.

3. The stabilized microsphere adhesive according to claim 2 wherein the vinyl-unsaturated additive is a styrene sulfonate salt.

4. The stabilized microsphere adhesive according to claim 2 wherein the vinyl-unsaturated additive is a 2-acrylomido-2-methylpropane sulfonate salt.

5. The stabilized microsphere adhesive composition according to claim 1 wherein the comonomer includes ionic, nonpolar monomers, polar monomers or mixtures thereof.

6. The stabilized microsphere adhesive composition according to claim 5 wherein the ionic monomers are selected from the group consisting of sodium methacrylate, ammonium acrylate, sodium acrylate, (I) trimethylamine p-vinyl benzimide, (II) 4,4, 9-trimethyl-4-azonia-7-oxo-8-oxa-dec-9-ene-1-sulphonate, (III) N,N-dimethyl-N-(β-methacryloxyethyl) ammonium propionate betaine, (IV) trimethylamine methacrylimide, (V) 1,1-dimethyl-1(2,3-dihydroxypropyl)amine methacrylimide; any zwitterionic monomer and mixtures thereof.

7. The stabilized microsphere adhesive composition according to claim 5 wherein the non-polar monomers are selected from the group consisting of 4-methyl-2-pentyl acrylate, 2-methylbutyl acrylate, isoamyl acrylate, sec-butyl acrylate, n-butyl acrylate, isodecyl methacrylate, t-butyl acrylate, t-butyl methacrylate, isobornyl acrylate, octyl acrylamide, methylmethacrylate, isononyl acrylate, isodecyl acrylate, styrene and the mixtures thereof.

8. The stabilized microsphere adhesive composition according to claim 5 wherein polar monomers may or may not contain a dissociable hydrogen and are selected from the group consisting of organic carboxylic acids comprising 3 to about 12 carbon atoms and having 1 to about 4 carboxylic acid moieties, acrylamide, methacrylamide, 2-hydroxyethyl acrylate, and mixtures thereof.

9. The stabilized microsphere adhesive composition according to claim 1 wherein the comonomer is an amino-functional monomer having the general formula:

$$CH_2=CHR_1-\overset{O}{\overset{\|}{C}}-L-R_2-(NR_3R_4)_x \quad (1)$$

wherein $R_1$ is —H,—$CH_3$,—$CH_2CH_3$, cyano or carboxymethyl;

$R_2$ is a hydrocarbyl radical comprising 1 to about 12 carbon atoms;

$R_3$ and $R_4$ are independently H or an alkyl group containing 1 to about 12 carbon atoms or an arylalkyl group or together form a cyclic or heterocyclic moiety;

L is carbon—carbon bond, O, NH or S; and x is an integer of 1 to 3.

10. The stabilized microsphere adhesive composition according to claim 1 wherein the comonomer is has the general formula:

$$CH_2=CHR_1-\overset{O}{\overset{\|}{C}}-L-R_2(R_5)_xR_6 \quad (2)$$

wherein $R_1$ is H,—$CH_3$,—$CH_2CH_3$, cyano or carboxymethyl;

$R_2$ is a hydrocarbyl radical comprising 1 to about 12 carbon atoms;

$R_5$ is —O—, alkylene oxide comprising 1 to 5 carbon atoms, or phenoxy oxide, wherein the alkylene oxide is —$CH_2O$—,—$CH_2CH_2O$—, or —$CH_2(CH)CH_3O$—;

$R_6$ is H,—$C_6H_4OH$, or —$CH_3$

L is a carbon—carbon bond, O, NH or S; and x is an integer with the proviso that when $R_5$ is —O—, x is an integer of 1–3.

11. The stabilized microsphere adhesive composition according to claim 1 wherein the comonomer is an amidofunctional monomer general formula:

$$CH_2=CHR_1-\overset{O}{\overset{\|}{C}}-NR_3R_4 \quad (3)$$

wherein $R_1$ is H,—$CH_3$,—$CH_2CH_3$, cyano or carboxymethyl; and $R_3$ $R_4$ are independently H or an alkyl group containing 1 to about 12 carbons or an arylalkyl group or together form a cyclic or heterocyclic moiety.

12. The stabilized microsphere adhesive composition according to claim 1 wherein the comonomer is (meth) acrylonitrile, furfuryl (meth)acrylate and tetrahydrofurfuryl (meth)acrylate, 2-vinyl pyridine, or 4-vinyl pyridine.

13. The stabilized microsphere adhesive composition according to claim 1 wherein when a comonomer is present, the relative amounts by weight of the alkyl (meth)acrylate monomer(s) and the comonomer is in the range of about 99.5/0.5 to 75/25.

14. The stabilized microsphere adhesive composition according to claim 1 wherein the surfactant is in an amount of about 0.2 to 1.5 parts by weight per 100 parts by weight of the microspheres.

15. The stabilized microsphere adhesive composition according to claim 1 wherein the modifier is a chain transfer agent.

16. The stabilized microsphere adhesive composition according to claim 1 wherein the modifier is a solvent.

17. The stabilized microsphere adhesive composition according to claim 1 wherein the modifier is a tackifier.

18. The stabilized microsphere adhesive composition according to claim 1 wherein the modifier is a plasticizer.

19. A one step polymerization process for preparing polymeric elastomeric microspheres comprising the steps of:

(a) stirring or agitating a mixture comprising polymerizable monomer starting materials comprising:

(i) at least one $C_4$-$C_{14}$ alkyl (meth)acrylate monomer and, optionally at least one comonomer;

(ii) from 0.1 to 3 parts by weight of at least one vinyl-unsaturated additive having both an ionic moiety and a hydrophobic moiety and containing at least 5 but not more than 40 carbon atoms, (iii) an initiator for the polymerizable monomer starting materials present in amounts ranging from 0.1 to approximately 2 parts per weight per 100 parts by weight of the polymerizable monomer starting materials;

(iv) optionally, a polymeric stabilizer in an amount in the range of 0.1 to about 3 parts by weight per 100 parts by weight of the polymerizable monomer starting materials;

(v) a surfactant in an amount no greater than about 5 parts by weight per 100 parts by weight of polymerizable monomer;

(vi) water to form an oil in water suspension; and (vii) optionally a modifier in an amount sufficient to provide a n-heptane soluble portion in the range of 30–98%; and (b) polymerizing the (meth)acrylate monomer(s) and the comonomer(s), if present; wherein microspheres are provided.

20. A two step polymerization process for preparing polymeric elastomeric microspheres comprising the steps of:

(a) stirring or agitating a mixture comprising:

(i) at least one $C_4$–$C_{14}$ alkyl (meth)acrylate monomer;

(ii) from 0.1 to 3 parts by weight of at least one vinyl-unsaturated additive having both an ionic moiety and a hydrophobic moiety and containing at least 5 but not more than 40 carbon atoms, (iii) an initiator for the monomer present in amounts ranging from 0.1 to approximately 2 parts per weight per 100 parts by weight of the polymerizable monomer starting materials;

(iv) optionally, a polymeric stabilizer in an amount in the range of 0.1 to about 3 parts by weight per 100 parts by weight of the polymerizable monomer starting materials;

(v) a surfactant in an amount of no greater than about 5 parts by weight per 100 parts by weight of the polymerizable monomer starting materials;

(vi) optionally a modifier in an amount sufficient to provide a n-heptane soluble portion in the range of 30–98%; and (vii) water to form an oil in water suspension;

(b) at least partially polymerizing the polymerizable monomer starting materials;

(c) adding to the suspension at least one comonomer; and (d) continuing the polymerization of the polymerizable monomer starting materials; wherein microspheres are provided.

* * * * *

UNITED STATES PATENT AND TRADEMARK OFFICE
CERTIFICATE OF CORRECTION

PATENT NO.: 5,756,625

DATED: May 26, 1998

INVENTOR(S): Crandall et al.

It is certified that error appears in the above-identified patent and that said Letters Patent is hereby corrected as shown below:

In column 1, line 28, replace "a" with -- acrylates --

Below Table 4 add -- *unstable, coagulated in particle size analyzer --

Signed and Sealed this

Second Day of February, 1999

Attest:

Attesting Officer

*Acting Commissioner of Patents and Trademarks*